United States Patent
Cejnek et al.

(10) Patent No.: US 9,188,315 B2
(45) Date of Patent: Nov. 17, 2015

(54) FIXING SYSTEM FOR LIGHTING FIXTURE PARTS, ESPECIALLY AUTOMOBILE LIGHTS

(71) Applicants: Milan Cejnek, Novy Jicin (CZ); Jindrich Chylek, Bilovec (CZ); Robert Rysavy, Skotnice (CZ)

(72) Inventors: Milan Cejnek, Novy Jicin (CZ); Jindrich Chylek, Bilovec (CZ); Robert Rysavy, Skotnice (CZ)

(73) Assignee: VARROC LIGHTING SYSTEMS, S.R.O. (CZ)

( * ) Notice: Subject to any disclaimer, the term of this patent is extended or adjusted under 35 U.S.C. 154(b) by 106 days.

(21) Appl. No.: 13/973,487

(22) Filed: Aug. 22, 2013

(65) Prior Publication Data

US 2014/0198511 A1    Jul. 17, 2014

(30) Foreign Application Priority Data

Jan. 16, 2013   (CZ) .................... PV 2013-29

(51) Int. Cl.
| | |
|---|---|
| *F21V 17/10* | (2006.01) |
| *F21S 8/10* | (2006.01) |
| *B29C 65/48* | (2006.01) |
| *B29C 65/56* | (2006.01) |
| *B29C 65/72* | (2006.01) |
| *B29C 65/00* | (2006.01) |
| *B29L 31/00* | (2006.01) |
| *B29L 31/30* | (2006.01) |

(52) U.S. Cl.
CPC .............. *F21V 17/101* (2013.01); *B29C 65/48* (2013.01); *B29C 65/564* (2013.01); *B29C 65/72* (2013.01); *B29C 66/12441* (2013.01); *B29C 66/12469* (2013.01); *B29C 66/54* (2013.01); *F21S 48/1208* (2013.01); *F21S 48/2206* (2013.01); *B29L 2031/3055* (2013.01); *B29L 2031/747* (2013.01)

(58) Field of Classification Search
CPC ...... F21S 48/00; F21S 48/1208; F21V 17/101
See application file for complete search history.

(56) References Cited

U.S. PATENT DOCUMENTS

| | | | |
|---|---|---|---|
| 5,267,386 A | 12/1993 | Brooks | |
| 5,556,584 A * | 9/1996 | Yamazaki et al. | 264/46.5 |
| 5,562,338 A * | 10/1996 | Yamamoto | 362/521 |
| 5,609,407 A * | 3/1997 | Yanagihara et al. | 362/547 |
| 6,045,246 A * | 4/2000 | Goto | 362/521 |
| 6,059,433 A * | 5/2000 | Otaka et al. | 362/507 |
| 6,416,202 B1 * | 7/2002 | Masuda et al. | 362/267 |

FOREIGN PATENT DOCUMENTS

| | | |
|---|---|---|
| CZ | 296970 B6 | 9/2004 |
| DE | 4310048 A1 | 9/1994 |
| DE | 102008025609 A1 | 12/2009 |
| DE | 102008025610 A1 | 12/2009 |
| EP | 2223794 A1 | 9/2010 |

* cited by examiner

*Primary Examiner* — Elmito Breval
(74) *Attorney, Agent, or Firm* — Cantor Colburn LLP

(57) ABSTRACT

A fixing system for lighting fixture parts, especially the lights of an automobile, includes a thermoplastic outer lens (2), which is installed in a thermoplastic encircling housing (3) by means of a sealing adhesive (4) and secured by fastening elements. The fixing element is a brad pin (1) which is shot through a groove (31) of the encircling housing (3) and a lug (21) of the outer lens (2), with a profile in the shape of a circle flattened at least at two diametrically opposite places, having a longitudinally smooth brad pin shank (14) along its entire length, which is covered by an adhesive (112) to hold the brad pins (1) together.

17 Claims, 3 Drawing Sheets

Figure 4:
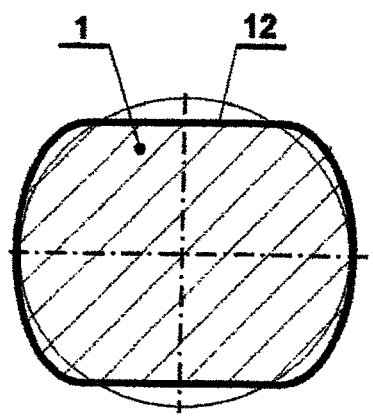

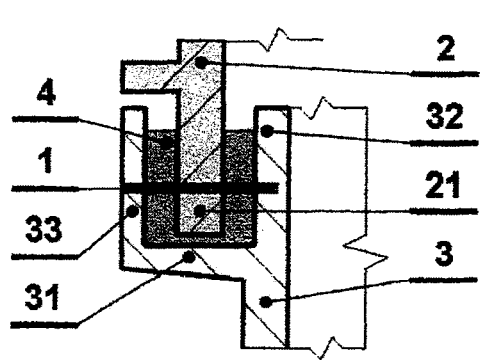
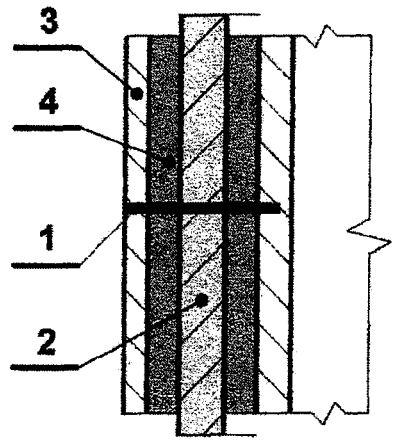
Fig. 1a
Fig. 1b
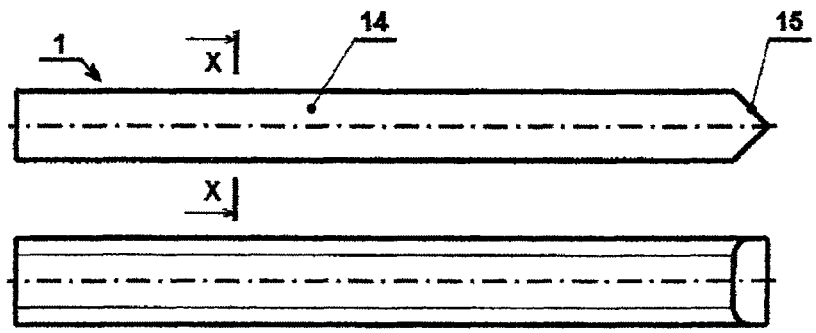
Fig. 2
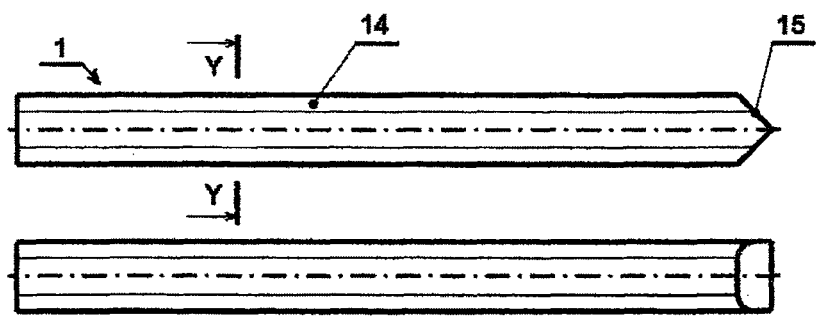
Fig. 3

Section X-X

Section Y-Y

FIXING SYSTEM FOR LIGHTING FIXTURE PARTS, ESPECIALLY AUTOMOBILE LIGHTS

FIELD OF TECHNOLOGY

The invention concerns a Fixing system for lighting fixture parts, especially automobile lights.

PRIOR ART

From the specification of U.S. Pat. No. 5,267,386 there is known a design describing a method of securing an outer lens to a housing, where a hot rolled wire is forced through a plastic housing and the ribs of the plastic outer lens with total plasticization of the plastic material. The drawback of this solution is its low production effectiveness and limited possibility of automation.

From the specification of DE Patent No. 4310048 there is further known a method of using nails of circular cross section, by which the outer lens and the housing are joined together with the use of partial ultrasound plasticization of their material. This method is not sufficiently effective, since mechanical loading during the process produces deformation of the joined parts, and the circular cross section of the nail enables a rotation about its lengthwise axis. Moreover, the additional operation of predrilling produces dust particles inside the lighting appliance.

There is also known from the specification of CZ Patent No. 296 970 a fastening means, being a clip in the shape of the letter U or the letter J. This complicated shape with two feet creates an internal stress between the contact points of the feet in the joined plastic parts, which leads to the formation of stress cracks under the influence of a corrosive environment. There is also known a solution (specification DE No. 10 2008 025 609) describing a method of primary fastening of two plastic parts in a mutual joint, performed without the use of adhesive, in which they are preheated by hot air, laser, or infrared light, before inserting a fastening nail in order to bring about a partial plasticization of the joined parts. In this case, the drawback is the risk of producing flaws in the appearance of the product in the heated region, due to the high temperature.

A solution is also known from specification of EP No. 2,223,794, enabling a primary fixing of three or more plastic parts, such as a outer lens, a housing, and another part (frame, interior optical part, filter, reflector, socket, etc.), all of which are joined without the use of adhesive. A fastening element of nail type contains a head and a shaft. The fastening element has a profile of square shape, with a rectangular head and locking grooves situated along the entire length of the shaft. The drawback of this solution is less accuracy of the external shape of the lighting appliance, due to the greater number of joined parts, all of which are in the required contact position, and the creation of cracks under stress due to the corrosive environment in the shell and the lens, as a result of deformation caused by the head.

ESSENCE OF THE INVENTION

The aforementioned drawbacks of the known designs are eliminated to a substantial degree by a fixing system of lighting fixture parts, especially the lights of an automobile, including a thermoplastic outer lens, which is installed in a thermoplastic encircling housing by means of a sealing adhesive and secured by fastening elements according to the invention, the essence of which lies in the fact that the fixing element is a brad pin which is shot through a groove of the encircling housing and a lug of the outer lens, with a profile in the shape of a circle flattened at least at two diametrically opposite places, having a longitudinally smooth brad pin shank along its entire length, which is covered by an adhesive to hold the brad pins together in the lug.

Another essence of this solution is the fact that the width of the brad pin is greater than the distance between the parallel lines of its two flat areas.

In an advantageous embodiment, the profile of the brad pin has four flattened areas, each of which is oriented perpendicular with respect to the two neighboring flats.

Another essence of this solution is the fact that the brad pin is made from a material which is harder than the material of the lug of the outer lens and the groove of the encircling housing, and the adhesive for holding together the brad pins in the lug is based on nitrolack.

The advantage of this solution is that the material of the outer lens and the housing remains constantly cold and is not plasticized by the hot air or by some other medium, or otherwise heated. The brad pin is shot through the lug of the outer lens and a flange of the housing, while its circular profile is bounded by at least two parallel flattened areas, situated at two diametrically opposite places, to prevent rotation of the brad pin about its lengthwise axis. Moreover, the side or corner arcs produced by the flattening reduce the stress in the joined parts and the formation of stress cracks under the action of the corrosive environment, both for the outer lens and for the housing.

The adhesive on the surface of the brad pins acts as a sliding layer when they are shot in, and this furthermore creates a sealing joint between the surface of the brad pin and the outer lens and housing.

REVIEW OF THE FIGURES IN THE DRAWINGS

Figure 5:
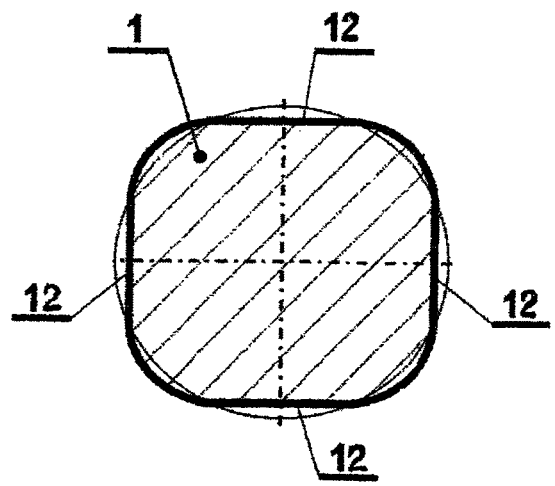
Figure 6:
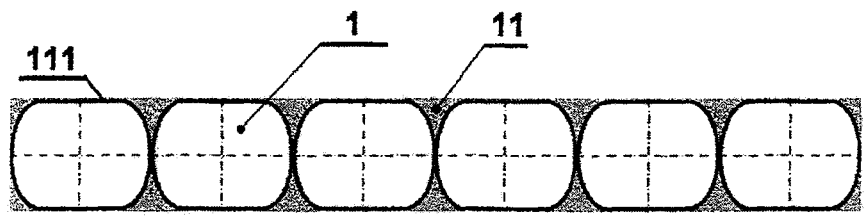
Figure 7:
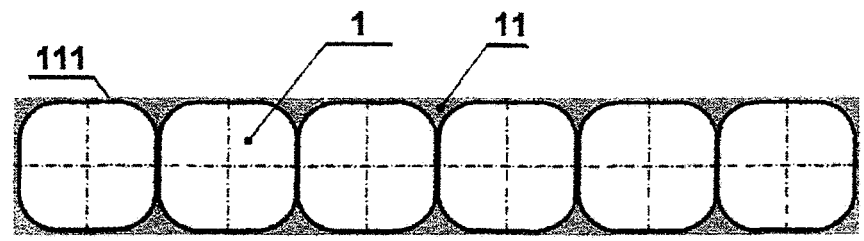

A sample embodiment of the fixing system for lighting fixture parts, especially the lights of an automobile, consisting of a thermoplastic outer lens, which is installed in a thermoplastic encircling housing by means of a sealing adhesive and secured by fixing elements according to this invention, is illustrated in the enclosed drawings, where FIG. 1a shows in detail a vertical section through the bottom part of the fixing of outer lens and housing, FIG. 1b shows in detail a horizontal section through the bottom part of the fixing of outer lens and housing, FIG. 2 a side view and plan view of one possible configuration of the brad pin, FIG. 3 a side view and plan view of another possible configuration of the brad pin, FIG. 4 a section through plane X-X of FIG. 2, FIG. 5 a section through plane Y-Y of FIG. 3, FIG. 6 a front view of the strip with one type of brad pins and FIG. 7 a front view of the strip with another type of brad pins.

SAMPLE EMBODIMENTS OF THE INVENTION

The fixing system for the parts of lighting fixtures for automobile lighting that is illustrated in FIG. 1a and FIG. 1b includes a thermoplastic outer lens 2 and a thermoplastic housing 3. The outer lens 2 and the housing 3 are glued/sealed by a sealing adhesive 4 and joined together by brad pins 1 through a lug 21 of the outer lens 2 and a groove 31 of the housing 3. The groove 31 of the housing 3 includes the outer flange 33 of the housing 3 and the inner flange 32 of the housing 3. The brad pin 1 has a length which prevents its full penetration through the wall of the inner flange 32 of the housing 3.

The primary fastening is accomplished by the sealing adhesive 4, which is applied as a first fastening element and upon hardening forms the basic joint between the outer lens 2 and the housing 3. The brad pin 1 serves as a second fastening element to ensure the position until the sealing adhesive 4 hardens.

The main advantage of the fastening system is the higher precision in fixing the outer lens 2 to the housing 3 before the primary fastening system of the sealing adhesive 4 begins to function after hardening. Another benefit is the more simple design of these parts.

The fastening is accomplished by at least three brad pins 1 in order to ensure the required stability of position of the outer lens 2 and the housing 3, and in order to achieve their expected positional tolerance on the vehicle.

The fastening is done on the cold parts, not heated either by hot air or by infrared light or by laser or by some other heating that is used for the thermal plasticization of the materials of the installed parts. The brad pins 1, shown in FIG. 2 and FIG. 3, consist of a brad pin shank 14 and a tip 15. The angle of the brad pin point 15 of the brad pin 1 can be 60° to 120°, in order to facilitate the installation. The brad pin shank 14 is longitudinally smooth, without locking grooves, and the brad pin 1 does not have a head, and its side parts are blunt.

One alternative profile of the brad pin 1 is shown in FIG. 4. The circular shape is bounded by parallel cut lines 12, which have a spacing from each other less than the width of the brad pin 1.

Another alternative profile of the brad pin 1 is shown in FIG. 5. The circular shape is bounded by two horizontal parallel lines 12 and two vertical parallel lines 12, joined by corner radii. The advantage of these profiles is a more robust fabrication of the strip 111 of the brad pins 1 and fewer stress cracks due to the corrosive environment of the lug 21 of the outer lens 2 and the inner flange 32 of the housing 3.

The brad pin 1 is made from a material which is harder than the material used for the lug 21 of the outer lens 2 and the groove 31 of the housing 3. The brad pins 1 are coated with an adhesive 11 to increase the adhesion between the brad pin 1 and the inner flange 32 of the housing 3 and the outer flange 33 of the housing 3 and the lug 21 of the outer lens 2. The material forming the joint adhesive 11 is based on epoxy.

The brad pins 1, prior to the fastening process, are joined together within the strip 111 of brad pins 1 by the joint adhesive 11, 112, for easier handling when filling them into the brad pin gun. These strips 111 of brad pins, illustrated in FIG. 6 and FIG. 7, facilitate the automating of the production process.

A stapling device is used for the application of the brad pins 1. There are various systems for creating the required mechanical energy for shooting the brad pins 1: mechanical, pneumatic, or electrical. The system predominantly used is a pneumatic stapling machine with electrical control. The impact force of the air of the pneumatic stapler helps in driving the brad pin into the surface. The great force produced by the compressed air of the pneumatic stapler is able to force the brad pin into a material like plastic extremely quickly.

This fastening system for the parts of an automotive lighting system is simple, economical, and efficient.

LIST OF REFERENCE SYMBOLS USED

1—brad pin
11—adhesive
111—strip
12—parallel lines
14—brad pin shank
15—point
2—outer lens
21—lug
3—peripheral housing
31—slot
32—inner flange
33—outer flange
4—sealing adhesive

The invention claimed is:

1. A fixing system of lighting fixture parts, especially the lights of an automobile, comprising a thermoplastic outer lens, which is installed in a thermoplastic encircling housing by means of a sealing adhesive and secured by fastening elements characterized in that the fastening element is a brad pin which is shot through a groove of the encircling housing and a lug of the outer lens, with a profile in the shape of a circle flattened at least at two diametrically opposite places, having a longitudinally smooth brad pin shank along its entire length, which is covered by an adhesive to hold the brad pins together in the lug.

2. The fixing system according to claim 1, characterized in that the width of the brad pin is greater than the distance between the parallel lines of its two flat areas.

3. The fixing system according to claim 1, characterized in that the profile of the brad pin has four flattened areas, each of which is oriented perpendicular with respect to the two neighboring flats.

4. The fixing system according to claim 1, characterized in that the brad pin is made from a material which is harder than the material of the lug of the outer lens and the housing of the encircling shell.

5. The fixing system according to claim 1, characterized in that the adhesive for holding together the brad pins is based on nitro lack.

6. A fixing system of lighting fixture parts, comprising a thermoplastic outer lens, which is installed in a thermoplastic encircling housing by means of a sealing adhesive and secured by a fastening element, the fastening element comprising a brad pin which is inserted through a groove of the encircling housing and a lug of the outer lens to join the housing and the lens, the brad pin having a longitudinally extending brad pin shank, the brad pin shank having at least two longitudinally extending opposed flats joined to one another by longitudinally extending opposed outwardly convex curved portions.

7. The fixing system according to claim 6, wherein the brad pin has an adhesive on an outer surface that fixes the brad pin to the lug.

8. The fixing system according to claim 7, wherein the adhesive comprises epoxy.

9. The fixing system according to claim 6, wherein a width of the brad pin between the opposed outwardly convex curved portions is greater than a distance between the at least two opposed flats.

10. The fixing system according to claim 9, wherein the brad pin has an adhesive on an outer surface that fixes the brad pin to the lug.

11. The fixing system according to claim 6, wherein the brad pin has four flats, each of which is oriented perpendicular with respect to the two neighboring flats.

12. The fixing system according to claim 11, wherein the opposed outwardly convex curved portions comprise four outwardly convex curved corner portions that extend between adjacent flats.

13. The fixing system according to claim 12, wherein the brad pin has an adhesive on an outer surface that fixes the brad pin to the lug.

14. The fixing system according to claim 6, wherein the brad pin is made from a material which is harder than the material of the lug of the outer lens and the encircling housing.

15. The fixing system according to claim 6, wherein an end of the brad pin inserted into the encircling housing and the lug has an angled point.

16. The fixing system according to claim 15, wherein the angled point described an angle of 60° to 120°.

17. A fixing system of lighting fixture parts, especially the lights of an automobile, comprising a thermoplastic outer lens, installed in a thermoplastic encircling housing by means of a sealing adhesive and secured by fastening elements, the fastening elements comprising brad pins shot through a groove of the encircling housing and a lug of the outer lens, the brad pins arranged in a strip for filling the brad pins into a stapling device for shooting the brad pins into an inner flange of the housing, the lug, and an outer flange of the housing, the brad pins having a longitudinally extending shank having a transverse shape of a circle flattened at least at two diametrically opposite places and joined together by a joint adhesive based on epoxy.

* * * * *